US011354357B2

United States Patent
Thomsen

(10) Patent No.: US 11,354,357 B2
(45) Date of Patent: Jun. 7, 2022

(54) DATABASE MASS ENTRY INSERTION

(71) Applicant: SAP SE, Walldorf (DE)

(72) Inventor: Dirk Thomsen, Berlin (DE)

(73) Assignee: SAP SE, Walldorf (DE)

( * ) Notice: Subject to any disclaimer, the term of this patent is extended or adjusted under 35 U.S.C. 154(b) by 284 days.

(21) Appl. No.: 16/261,361

(22) Filed: Jan. 29, 2019

(65) Prior Publication Data

US 2020/0242160 A1 Jul. 30, 2020

(51) Int. Cl.
*G06F 16/23* (2019.01)
*G06F 16/901* (2019.01)

(52) U.S. Cl.
CPC .................. *G06F 16/901* (2019.01)

(58) Field of Classification Search
CPC .. G06F 16/27; G06F 16/2365; G06F 16/2379; G06F 16/2358; G06F 16/23
See application file for complete search history.

(56) References Cited

U.S. PATENT DOCUMENTS

| | | | |
|---|---|---|---|
| 9,122,578 B2* | 9/2015 | Kamphenkel | G06F 12/0246 |
| 9,697,242 B2* | 7/2017 | Alvey | G06F 16/221 |
| 2006/0155920 A1* | 7/2006 | Smith | G06F 3/064 |
| | | | 711/103 |
| 2012/0323854 A1* | 12/2012 | Schreter | G06F 11/1461 |
| | | | 707/650 |
| 2014/0279961 A1* | 9/2014 | Schreter | G06F 3/0673 |
| | | | 707/693 |
| 2015/0363456 A1* | 12/2015 | Raman | G06F 16/282 |
| | | | 707/693 |

* cited by examiner

*Primary Examiner* — Etienne P Leroux
*Assistant Examiner* — Cindy Nguyen
(74) *Attorney, Agent, or Firm* — Klarquist Sparkman, LLP

(57) ABSTRACT

A database system receives a mass insert operation command specifying a plurality of entries. Thereafter, the entries are iteratively inserted into a plurality of preliminary pages associated with a container provided by a persistence layer of the database system. Thereafter, the preliminary pages are registered to the container once they are full.

20 Claims, 5 Drawing Sheets

DATABASE MASS ENTRY INSERTION

TECHNICAL FIELD

The current subject matter is directed to advanced database techniques in which multiple records are inserted into pages loaded into memory of an in-memory database.

BACKGROUND

With an in-memory database, records are inserted into pages loaded into memory to enable more rapid operations. These pages are subsequently flushed into physical persistence so that any changes in such pages can be permanently stored. The process of inserting records pages into the pages loaded into memory can, in some cases, be resource intensive and slow down database performance.

SUMMARY

In one aspect, a database system receives a mass insert operation command specifying a plurality of entries. Thereafter, the entries are iteratively inserted into a plurality of preliminary pages associated with a container provided by a persistence layer of the database system. Thereafter, the preliminary pages are registered to the container once they are full.

In some variations, a last of the plurality of preliminary pages remains partially filled after the insertion of the entries. The last page can be added to free space handling to allow single entry insert operations to insert single entries into the last preliminary page until the last preliminary page becomes full. In some variations, entries are moved into the last preliminary page to a different page within the container. Such different page can, for example, be a page having a type other than a preliminary page type. The last preliminary page can be deleted after the entries are moved to the different page.

The last preliminary page can be made available for mass insert operations specified by a subsequently second received mass insert operation command. The last preliminary page can be made available for the mass insert operations specified by a subsequently second received mass insert operation command.

The container can be a fixed size entry container in which all entries inserted into such container have a same size. Alternatively, the container can be a variable size entry container in which entries inserted into such container can have varying sizes.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to techniques for more efficiently inserting numerous records into pages loaded into memory of an in-memory database. Such an arrangement is advantageous in that it is more rapid than individual record insertion which results in reduced computing resource consumption.

Figure 1:
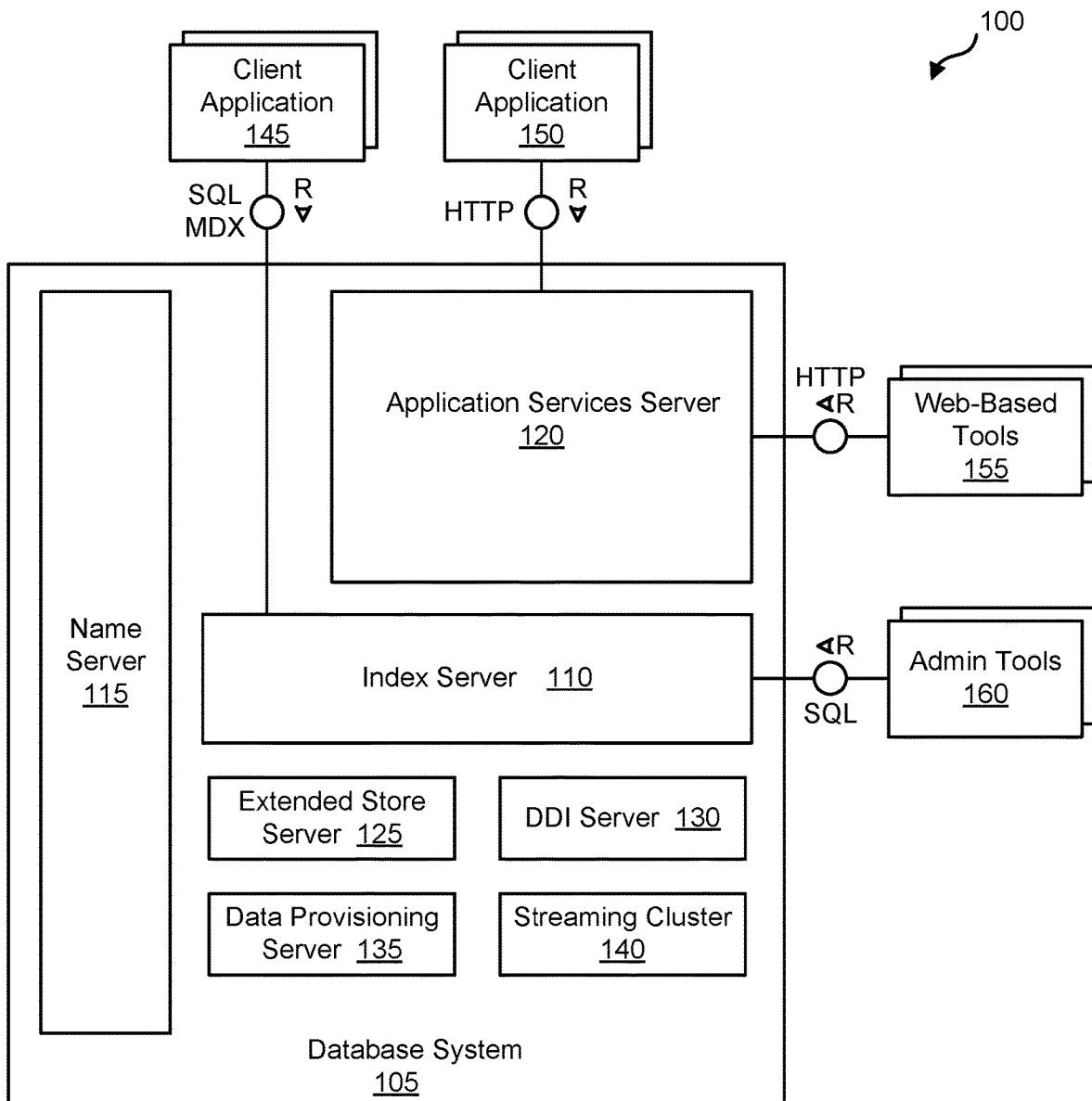
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application services server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application services server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have The current subject matter is directed to techniques for more efficiently inserting numerous records into pages loaded into memory of an in-memory database. Such an arrangement is advantageous in that it is more rapid than individual record insertion which results in reduced computing resource consumption.

The application services server 120 can enable native web applications used by one or more remote clients 150 accessing the database system 105 via a web protocol such as HTTP. The application services server 120 can allow developers to write and run various database applications without the need to run an additional application server. The application services server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
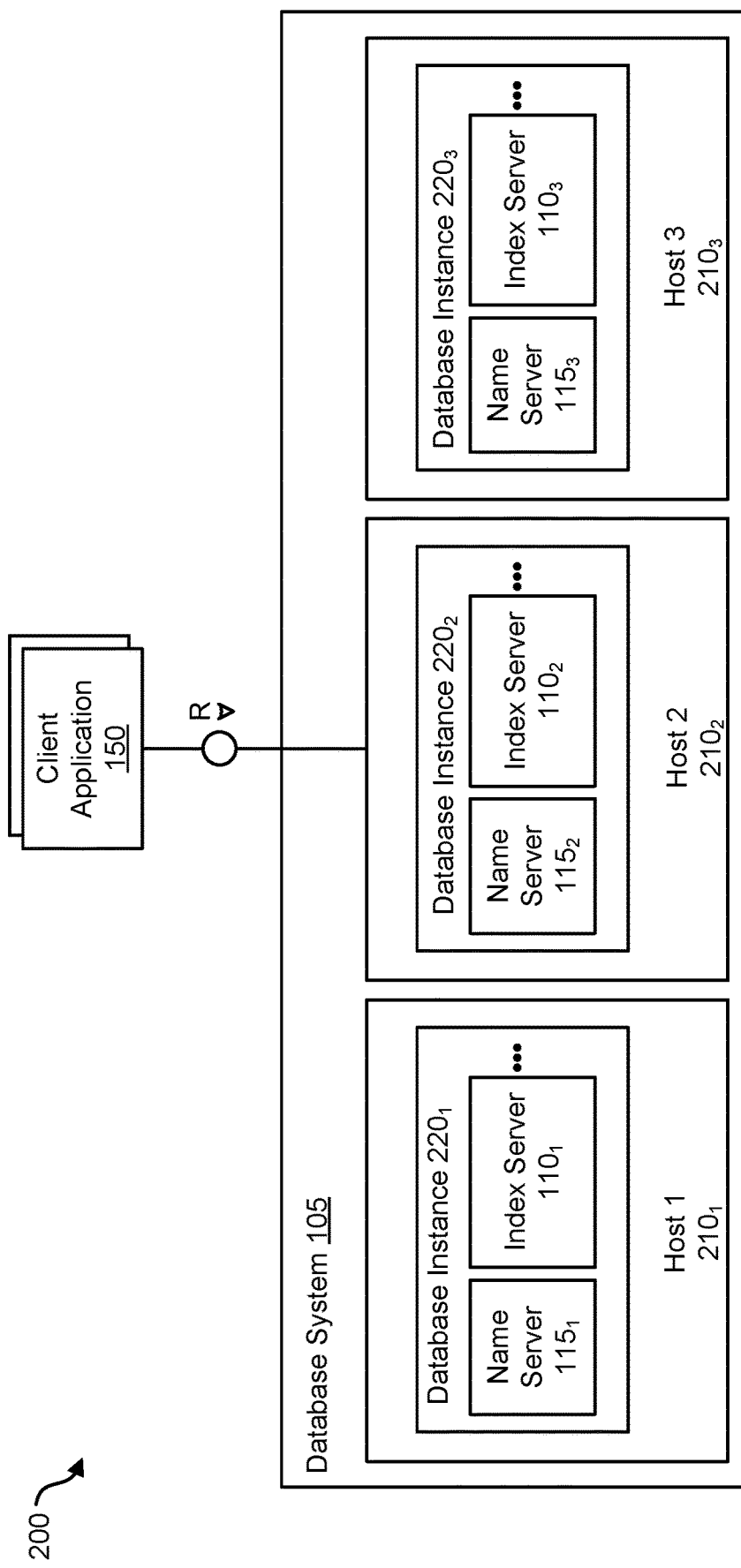
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
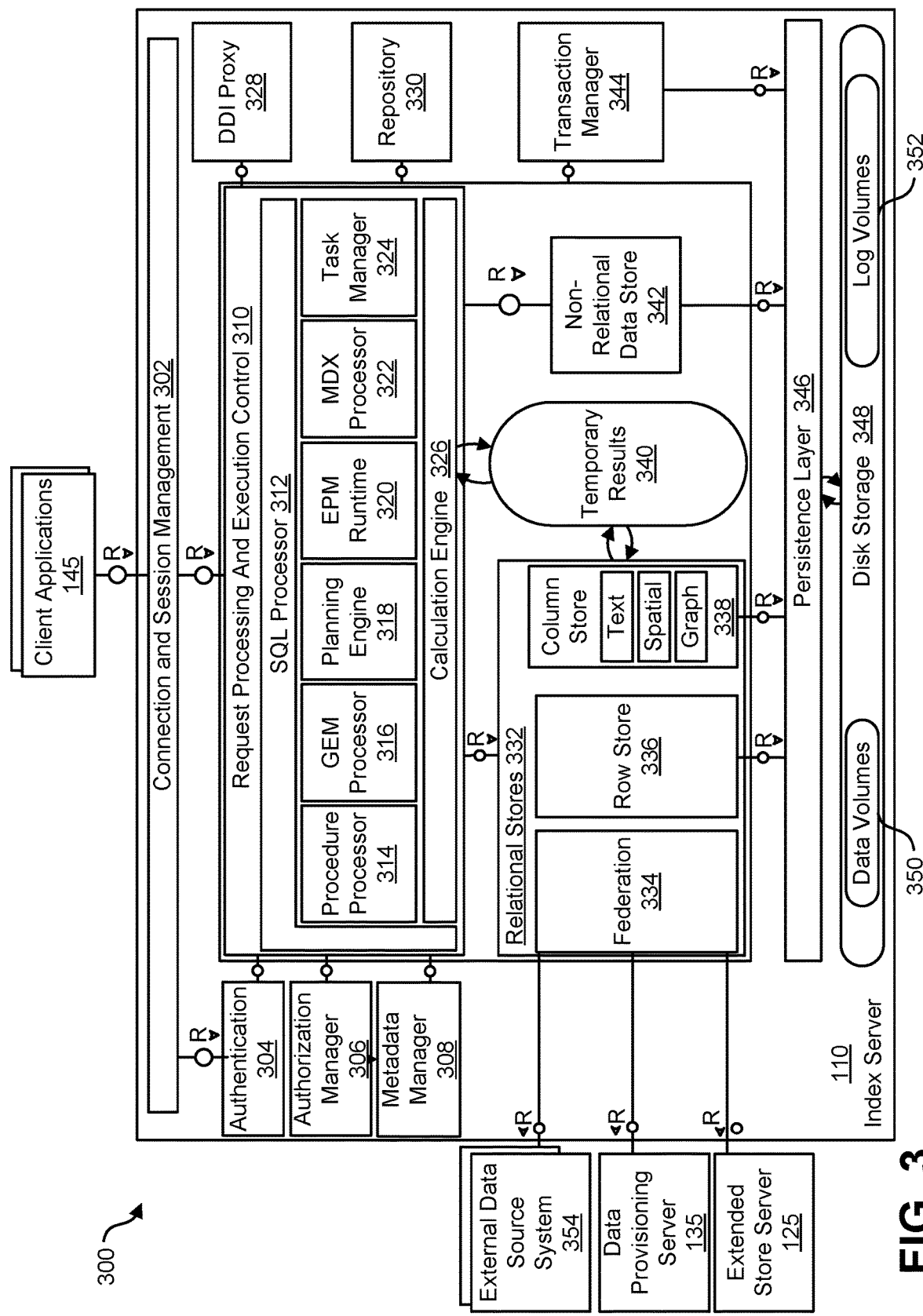
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager component 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects (e.g., records, etc.) can be directly stored in containers provided by the persistence layer 346. Fixed size entry containers can be used to store objects of one class.

Further, the pages included in data volumes 350 can be configured to store entries of variable sizes. Containers can store entries of variable size (sometimes referred to as variable sized entry containers) and the pages encapsulated within such containers can be referred to as variable size entry pages. Such an arrangement differs from containers used for fixed size entries which can be implemented and optimized in a different manner. Deleting entries in these variably sized entry pages can result in fragmentation. A transient data structure can be used to store information about pages in the persistence layer 346 with free space and deleted entries that can be reused.

Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, undo and cleanup logs, shadow paging and savepoints. The persistence layer 346 can provide interfaces for writing and reading persisted data and it can also contain a logger component that manages a recovery log. Recovery log entries can be written in the persistence layer 346 (in recovery log volumes 352) explicitly by using a log interface or implicitly when using the virtual file abstraction. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g. free up space occupied by deleted data etc.).

The persistence layer 346 stores data in persistent disk storage 348 which, in turn, can include data volumes 350 and/or recovery log volumes 352 that can be organized in pages. Different page sizes can be supported, for example, between 4 KB and 16 MB. In addition, superblocks can also be supported which can have a larger size such as 64 MB and which can encapsulate numerous pages of different sizes. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

As noted above, the data volumes 350 can include a data store that together with undo and cleanup log and recovery log volumes 352 comprise the recovery log. Other types of storage arrangements can be utilized depending on the desired configuration. The data store can comprise a snapshot of the corresponding database contents as of the last system savepoint. The snapshot provides a read-only static view of the database as it existed as of the point (i.e., time, etc.) at which it was created. Uncommitted transactions, at such time, are not reflected in the snapshot and are rolled back (i.e., are undone, etc.). Database snapshots operate at the data-page level such that all pages being modified are copied from the source data volume to the snapshot prior to their being modified via a copy-on-write operation. The snapshot can store such original pages thereby preserving the data records as they existed when the snapshot was created.

System savepoints (also known in the field of relational database servers as checkpoints) can be periodically or manually generated and provide a point at which the recovery log can be truncated. The savepoint can, in some variations, include an undo log of transactions which were open in the savepoint and/or a cleanup log of transactions which were committed in the savepoint but not yet garbage collected (i.e., data which has been deleted by these transactions has been marked as deleted but has not been deleted in a physical manner to assure multi-version concurrency control).

The recovery log can comprise a log of all changes to the database system 105 since the last system savepoint, such that when a database server is restarted, its latest state is restored by replaying the changes from the recovery log on top of the last system savepoint. Typically, in a relational database system, the previous recovery log is cleared whenever a system savepoint occurs, which then starts a new, empty recovery log that will be effective until the next system savepoint. While the recovery log is processed, a new cleanup log is generated which needs to be processed as soon as the commit is replayed to avoid a growing data area because of deleted but not garbage collected data.

As part of a database system recovery/restart, after the savepointed state of data is restored, and before processing of the recovery log commences, all cleanup logs can be iterated through and, in implementations using a history manager, passed to the history manager for asynchronous garbage collection processing.

In addition, it can be checked if there are older versions of the cleanup log present in the savepoint which need to be processed synchronously with regard to the recovery log. In such cases, recovery log processing can wait until garbage collection of old versions of cleanup logs finish. However, recovery log processing can commence when there are newer versions of cleanup logs for garbage collection. In cases in which no old versions of cleanup logs exist, recovery log replay can start immediately after the cleanup log from the savepoint has been passed to the history manager.

A typical savepoint can have three phases. First, in the pre-critical phase all modified pages in the relational stores 332 (which are loaded into memory) can be iterated through and flushed to the physical persistence disk storage 348. Second, a critical phase can block all parallel updates to pages in the relational stores 332 and trigger all the remaining I/O (i.e., I/O for pages that are still being modified when the critical phase is entered) for the physical persistence disk storage 348 to ensure the consistent state of data. Lastly, a post-critical phase can wait for all remaining I/O associated with the physical persistence disk storage 348.

During normal operation (i.e., a non-recovery process, etc.), the database system 105 can cause pages from the disk storage 348 to be streamed into the page buffer in the memory of the database system 105. These pages can have different sizes from 4 KB to 16 MB, etc. For smaller page sizes, the write I/O can be slow (i.e., processing numerous small pages can create a bottleneck for a resource flushing thread, etc.). In order to overcome this restriction, in some variations, multiple smaller pages having the same size can be combined into chunks, then such chunks can trigger write I/O which causes the such pages to be written to disk 348.

Pages loaded into memory of the database system 105 (e.g., into buffers including small page buffers, etc.) can be assigned physical block numbers when they are first written within one savepoint cycle. These physical block numbers are used to determine where to store such pages in the disk storage 348. These physical block numbers can be sequentially assigned to each page by a resource flush thread during a savepoint cycle.

As will be described below, pages with sequential physical block numbers can, in some cases, be selectively combined into chunks (i.e., chunks of memory having a size sufficient to encapsulate two or more smaller pages, etc.). The chunks can be filled with smaller pages having a same page size until they are full, or alternatively, until such time as the physical block number is not sequential. Once these chunks are full or the physical block numbers no longer match (which may result in the chunk not being full), write I/O can be triggered causing the chunks to be persisted in disk storage 348.

As mentioned, above, objects can be directly stored in containers provided by the persistence layer 346 and certain types of these containers can be referred to as fixed size entry containers (i.e., they are entries of fixed size). Operations like insert or delete of an entry within the same page must be synchronized against each other, as the change data in the page header like number of entries within the page, linkage of free entries, etc. This synchronization can be done using compare and swap mechanism, but cache line misses might occur. To get maximum performance all kind of synchronization can be avoided for mass operations.

The database system 105 can provide for a SQL command that involves the insertion of multiple records into a container (sometimes referred to as a mass entry command and/or a mass insertion operation). Upon receipt of such a command, a method (referred to herein as provide preliminary page) will cause a preliminary page to be provided in the applicable container (which can be a fixed sized entry container or a variable sized entry container).

Page allocation can include allocating a provisional page and registering the provisional page. Allocation of the provisional page can including allocating a logical page, a corresponding page control block (i.e., purely transient data stored held with that page), and a handle to the page. Thereafter, the consumer can fill the page with data (e.g., information characterizing deltas, etc.). No consistent change is required for these activities.

Subsequently, the provisional page can be registered by passing the page handle assigned as part of the allocation of the provisional page. As part of the registration of the provisional page, a new logical page number is assigned, and the page is inserted into the resource container using such new logical page number. In addition, the page with the new logical page number can be identified as having been modified (which causes the registered page to be subsequently flushed to disk). A consistent change is required in this case as part of the savepoint.

In some cases, as part of an optimization, multiple pages may be register all non-registered provisional pages within one consistent change. Further information about page allocation can be found in co-pending U.S. patent application Ser. No. 15/970,704 filed on May 3, 2018 and entitled: "In-Memory Database Page Allocation", the contents of which are hereby fully incorporated by reference.

Once the preliminary page has been allocated, the entries to be inserted as specified by the SQL command are looped over (i.e., the SQL command is iterated over) and such entries are inserted in to the preliminary page. This insertion process does not involve any looks. Stated differently, the insertion process does not involve any looks as the operation on that page is single threaded. Entries are added until the page becomes completely full or all entries have been added. If the page becomes full, it will be registered, added to the FixedSizeEntryContainer and a new preliminary page will be allocated for the next entries to be added. This continues until all entries are added.

Given that the size of the entries are known, an applicable preliminary page size can be selected. For example, if the aggregate entries will require records having an aggregate size of 3K, then a 4K preliminary page can be selected. In another variation, if is known that there are 260K of entries, then a 256K preliminary page can be utilized in addition to another page (i) having a smaller size (e.g., a 4K page) or (ii) into which other records are going to be inserted).

Once the preliminary page is full, a method (sometimes referred to as a register preliminary page method) can cause the preliminary page to be registered to the container. Registration in this regard, means that a logical page number is assigned and the page is put into the resource container.

In some cases, the amount of mass insertion data (i.e., the aggregate size of the entries is unknown) which can result in the preliminary page only being partially filled. In such cases, the method does not select a page of a particular size but, rather, can use a default sized page (e.g., 256K, etc.). This situation can occur when handling the last entries specified by the SQL command (i.e., entries which could not fit onto a previous page) which requires a last preliminary page.

In one scenario, this last preliminary page can be inserted with single insert operations until such time as it is full or all of the entries specified by the SQL command have been added to pages (sometimes referred to as free-space handling).

In other scenarios, remaining entries can be inserted into pre-existing partially filled pages and/or entries within a partially-filled preliminary page can be moved from such page to a pre-existing partially-filled registered page. Such a scenario can be avoided if the number/size of entries are known in advance so that single insert operations can commence when the earlier preliminary pages are filled by the mass insert operations. In cases in which entries are moved from the last page, the last page can be deleted after the entries have been moved to another page within the container.

In yet another scenario, instead of registering a partially-filled last page (as part of the mass insertion operation specified by the SQL command), such partially-filled last page can be kept for further mass insertion operations. Such partially-filled past page can be registered and flagged as being partially full and available for subsequent mass insert operations. This preliminary page would then be registered to the container as per the above procedure once full.

Figure 4:
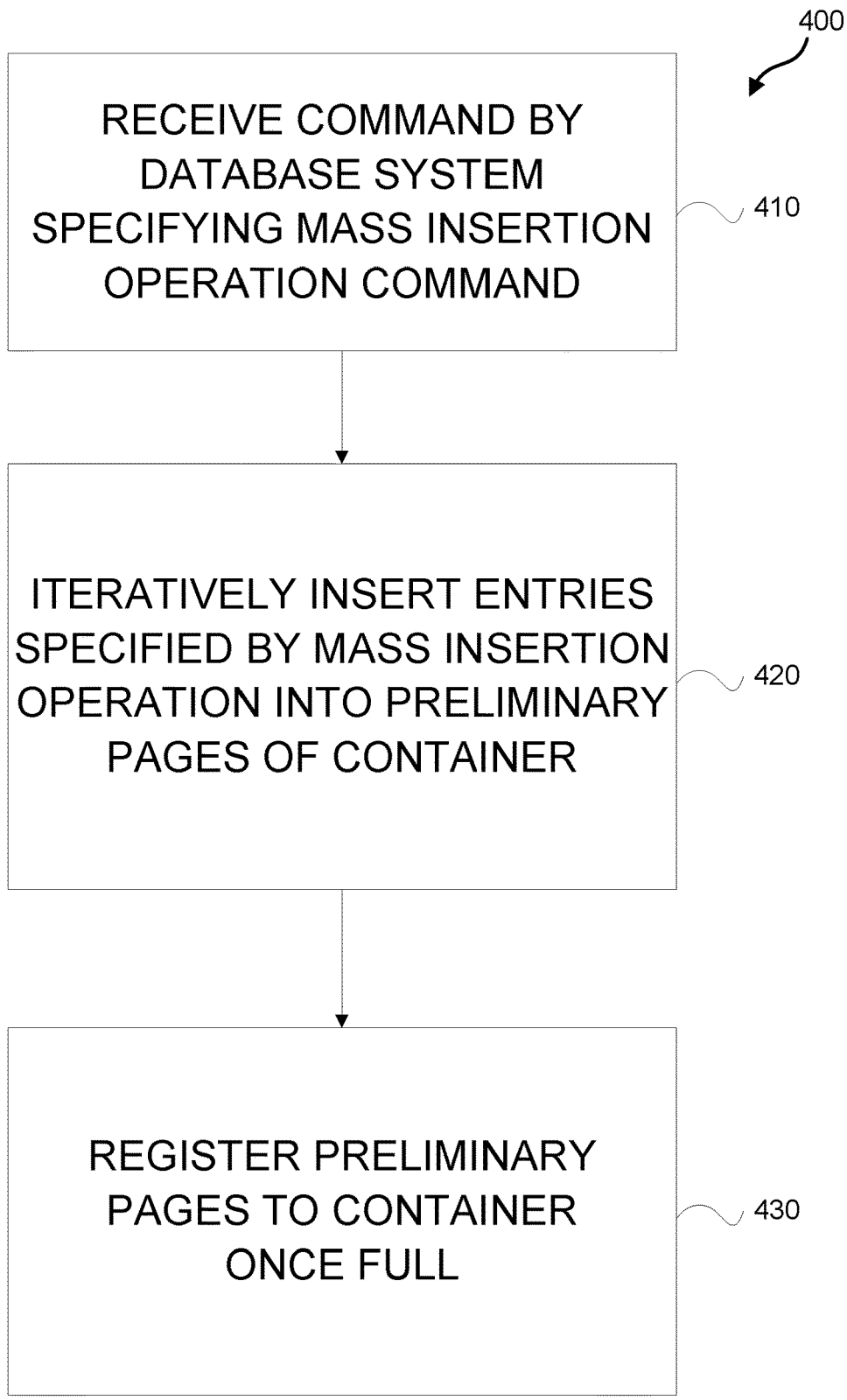
FIG. 4 is a process flow diagram illustrating techniques for mass insertion of records into pages of loaded into memory of an in-memory database.

FIG. 4 is a process flow diagram in in which, at 410, a mass insertion operation command specifying a plurality of entries is received by a database system. Thereafter, at 420, the entries are iteratively inserted into a plurality of preliminary pages associated with a container provided by a persistence layer of the database system. The preliminary pages are registered to the container, at 430, once they are full.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 5:
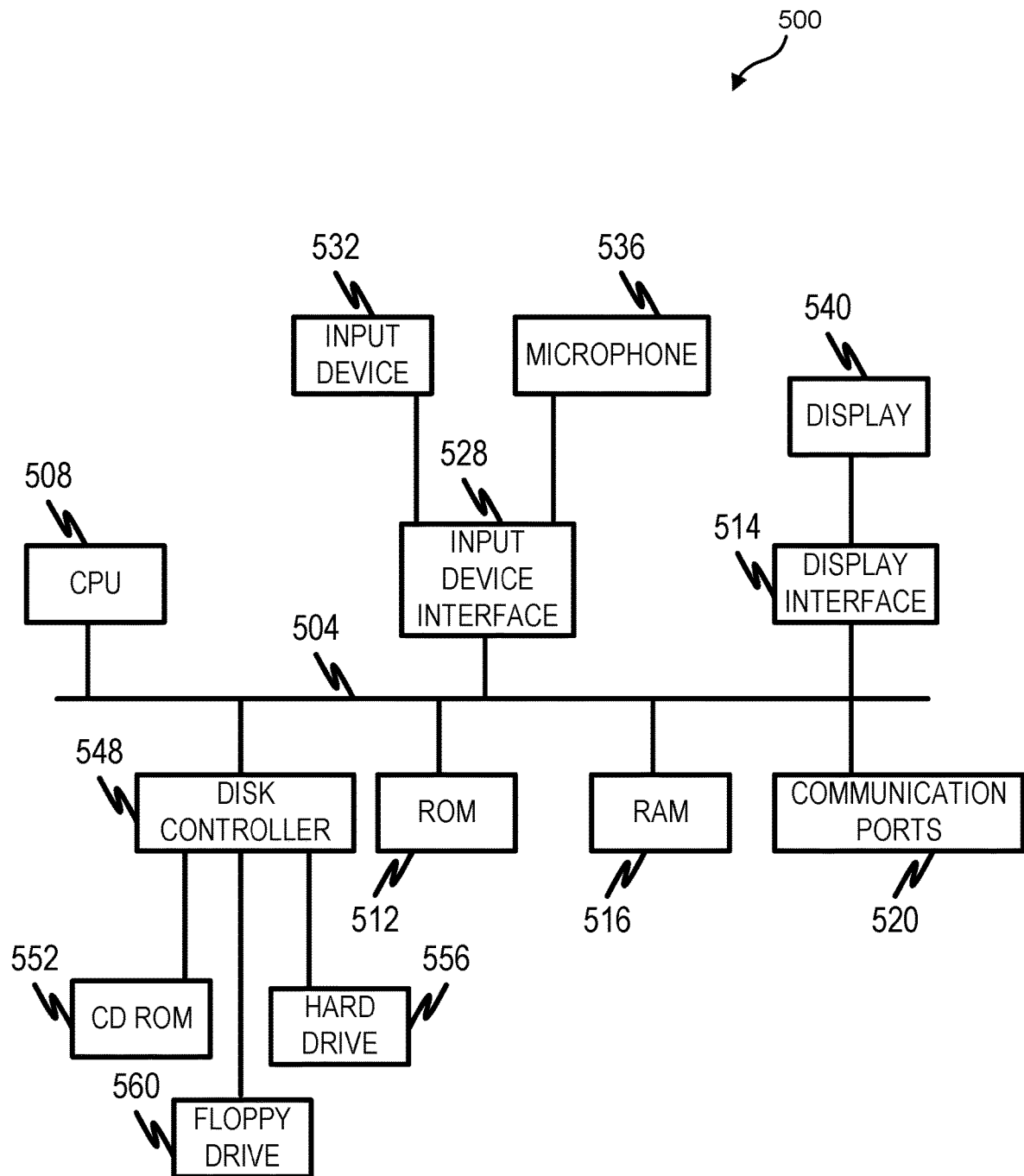
FIG. 5 is a diagram illustrating a sample computing device architecture for implementing various aspects described herein.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. In the input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, by a database system, a mass insert operation command specifying a plurality of entries, the database system being an in-memory database having main memory into which data is loaded for database operations and associated physical disk storage;
   allocating a plurality of preliminary pages;
   prior to allocating new logical page numbers to the plurality of preliminary pages, iteratively inserting the entries specified by the mass insert operation command into the plurality of preliminary pages on a page-by-page basis;

after each preliminary page is full with entries, allocating a new logical page number to the preliminary page full with entries; and
registering each preliminary page full with entries to a container provided by a persistence layer of the database system using the new logical page number.

2. The method of claim 1, wherein a last of the plurality of preliminary pages remains partially filled after the insertion of the entries.

3. The method of claim 2 further comprising:
adding the last page to free space handling to allow single entry insert operations to insert single entries into the last preliminary page until the last preliminary page becomes full.

4. The method of claim 2 further comprising:
moving entries inserted into the last preliminary page to a different page within the container.

5. The method of claim 4, wherein the different page is not a preliminary page.

6. The method of claim 4 further comprising:
deleting the last preliminary page after the entries are moved to the different page.

7. The method of claim 2 further comprising:
making the last preliminary page available for mass insert operations specified by a subsequently second received mass insert operation command.

8. The method of claim 7 further comprising:
flagging the last preliminary page as being available for the mass insert operations specified by a subsequently second received mass insert operation command.

9. The method of claim 1, wherein the container is a fixed size entry container in which all entries inserted into such container have a same size.

10. The method of claim 1, wherein the container is a variable size entry container in which entries inserted into such container can have varying sizes.

11. The method of claim 1 further comprising:
selecting one of a plurality of pre-defined preliminary page sizes based on a number of the specified plurality of entries prior to the iterative inserting.

12. A system comprising:
at least one data processor; and
memory storing instructions which, when executed by the at least one data processor, result in operations comprising:
receiving, by a database system, a mass insert operation command specifying a plurality of entries, the database system being an in-memory database having main memory into which data is loaded for database operations and associated physical disk storage;
allocating a plurality of preliminary pages;
prior to allocating new logical page numbers to the plurality of preliminary pages, iteratively inserting the entries specified by the mass insert operation command into the plurality of preliminary pages on a page-by-page basis;
after each preliminary page is full with entries, allocating a new logical page number to the preliminary page full with entries; and
registering each preliminary page full with entries to a container provided by a persistence layer of the database system using the new logical page number.

13. The system of claim 12, wherein a last of the plurality of preliminary pages remains partially filled after the insertion of the entries.

14. The system of claim 13, wherein the operations further comprise:
adding the last page to free space handling to allow single entry insert operations to insert single entries into the last preliminary page until the last preliminary page becomes full.

15. The system of claim 13, wherein the operations further comprise:
moving entries inserted into the last preliminary page to a different page within the container.

16. The system of claim 15, wherein the different page is not a preliminary page.

17. The system of claim 15, wherein the operations further comprise:
deleting the last preliminary page after the entries are moved to the different page.

18. The system of claim 13, wherein the operations further comprise:
making the last preliminary page available for mass insert operations specified by a subsequently second received mass insert operation command.

19. The system of claim 18, wherein the operations further comprise:
flagging the last preliminary page as being available for the mass insert operations specified by a subsequently second received mass insert operation command.

20. A non-transitory computer program product storing instructions which, when executed by at least one data processor forming part of at least one data processor, result in operations comprising:
receiving, by a database system, a SQL command comprising mass insert operation command that specifies a plurality of entries, the database system being an in-memory database having main memory into which data is loaded for database operations and associated physical disk storage;
allocating a plurality of preliminary pages;
prior to assigning new logical page numbers to the plurality of preliminary pages, iteratively inserting the entries specified by the mass insert operation command into the plurality of preliminary pages on a page-by-page basis;
after the preliminary pages are full with entries, assigning new logical page numbers to the preliminary pages full with entries; and
registering the preliminary pages full with entries to a container provided by a persistence layer of the database system using the new logical page numbers.

* * * * *